United States Patent
Szczepanski

(10) Patent No.: US 11,085,386 B1
(45) Date of Patent: Aug. 10, 2021

(54) UHEGO CONTROL TO MITIGATE THRESHOLD CATALYST LOSSES

(71) Applicant: DENSO International America, Inc., Southfield, MI (US)

(72) Inventor: Edward Szczepanski, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/820,978

(22) Filed: Mar. 17, 2020

(51) Int. Cl.
*B60T 7/12* (2006.01)
*F02D 41/02* (2006.01)
*F01N 3/10* (2006.01)
*F02D 41/14* (2006.01)

(52) U.S. Cl.
CPC ......... *F02D 41/0295* (2013.01); *F01N 3/101* (2013.01); *F02D 41/1441* (2013.01); *F02D 41/1454* (2013.01); *F02D 2200/0816* (2013.01)

(58) Field of Classification Search
CPC ........ F01N 11/007; F01N 3/00; F01N 3/0814; F01N 11/00; F01N 2550/00; F01N 2550/02; F02D 35/0015
USPC ................ 701/109; 60/274, 276, 277, 299
See application file for complete search history.

(56) References Cited

U.S. PATENT DOCUMENTS

| 5,433,071 | A | * | 7/1995 | Willey | ................. | B01D 53/94 60/274 |
|---|---|---|---|---|---|---|
| 7,276,212 | B2 | | 10/2007 | Hu et al. | | |
| 8,475,753 | B2 | | 7/2013 | Eckhoff et al. | | |
| 10,443,519 | B2 | | 10/2019 | Hashizume et al. | | |
| 2008/0210209 | A1 | * | 9/2008 | Hahn | .................. | F02D 41/0295 123/703 |
| 2015/0047415 | A1 | * | 2/2015 | Michalske | .......... | F02D 41/1495 73/23.31 |
| 2016/0108836 | A1 | * | 4/2016 | Odendall | ............ | F02D 41/1441 60/274 |
| 2018/0112613 | A1 | * | 4/2018 | Odendall | ............ | F02D 41/1454 |
| 2020/0003096 | A1 | * | 1/2020 | Knopp | ............ | F01N 3/101 |

* cited by examiner

*Primary Examiner* — John Kwon
(74) *Attorney, Agent, or Firm* — Burris Law, PLLC

(57) ABSTRACT

A system for enhancing internal combustion engine (ICE) exhaust gas aftertreatment includes a first universal heated exhaust gas oxygen (UHEGO) sensor disposed upstream from a first three-way catalytic (TWC) converter and a second UHEGO sensor disposed downstream from the first TWC converter and upstream from a second TWC converter. An engine controller for an ICE is included and is in communication with the first UHEGO sensor and the second UHEGO sensor. The engine controller is configured to monitor and estimate a current oxygen storage capacity (OSC) of the first TWC converter and adjust at least one target exhaust gas lambda parameter as a function of the current OSC of the first TWC converter such that compensation for degradation of the first TWC converter over time is provided.

20 Claims, 7 Drawing Sheets

UHEGO CONTROL TO MITIGATE THRESHOLD CATALYST LOSSES

FIELD

The present disclosure relates to catalyst loss mitigation and methods and systems mitigating catalyst degradation.

BACKGROUND

The statements in this section merely provide background information related to the present disclosure and may not constitute prior art.

An internal combustion engine typically includes an exhaust system to route or handle exhaust gas (i.e., combusted gases) expelled from one or more cylinders of the ICE. The exhaust system can include an exhaust gas aftertreatment system with a three-way catalytic converter to catalyze oxidization of carbon monoxide to carbon dioxide, oxidization of hydrocarbons to carbon dioxide and water, and reduction of nitrogen oxides (i.e., NOx) to nitrogen gas. Use of the TWC converter can prevent exhaust emissions from the ICE from exceeding government emission standards (e.g. the EPA Federal Test Procedure, commonly known as FTP-75 for a city driving cycle). However, in the event the TWC converter fails, exhaust emissions from the internal combustion engine are still required to meet government emission standards and back-up systems are used for such an event. Accordingly, a back-up three-way catalytic converter (i.e., a second or clean up catalytic converter) can be included in the exhaust gas aftertreatment system.

Issues related to three-way catalytic converter failure mitigation and other issues related to exhaust systems with three-way catalytic converters are discussed in the present disclosure.

SUMMARY

In one form of the present disclosure, a system for enhancing internal combustion engine (ICE) exhaust gas aftertreatment includes a first universal heated exhaust gas oxygen (UHEGO) sensor disposed upstream from a first three-way catalytic (TWC) converter and a second UHEGO sensor disposed downstream from the first TWC converter and upstream from a second TWC converter. An engine controller for an ICE is included and is in communication with the first UHEGO sensor and the second UHEGO sensor. Also, the engine controller is configured to monitor and estimate a current oxygen storage capacity (OSC) of the first TWC converter, and adjust at least one target exhaust gas lambda parameter as a function of the current OSC of the first TWC converter such that compensation for degradation of the first TWC converter over time is provided. In some variations of the present disclosure the at least one target exhaust gas lambda parameter is a predefined lambda minimum and a predefined lambda maximum for exhaust gas flowing through the first TWC converter. In other variations, the at least one target exhaust gas lambda parameter is a time period between switching between at least one of a rich target lambda and a lean target lambda for exhaust gas flowing through the first TWC converter and a lean target lambda and a rich target lambda for exhaust gas flowing through the first TWC converter.

In another form of the present disclosure, a method of enhancing ICE exhaust gas aftertreatment includes continuously monitoring and estimating a current OSC of a first TWC converter in an exhaust system of an ICE. The ICE has a plurality of cylinders and an exhaust aftertreatment system, and the exhaust aftertreatment system includes the first TWC converter, a second TWC converter downstream from the first TWC converter; a first UHEGO sensor disposed upstream from the first TWC converter, a second UHEGO sensor disposed downstream from the first TWC converter and upstream from the second TWC converter, and an engine controller for the ICE. The engine controller is in communication with the first UHEGO sensor and the second UHEGO sensor and at least one target exhaust gas lambda parameter is adjusted as a function of the current estimated OSC of the first TWC converter such that compensation for degradation of the first TWC converter over time is provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4A:
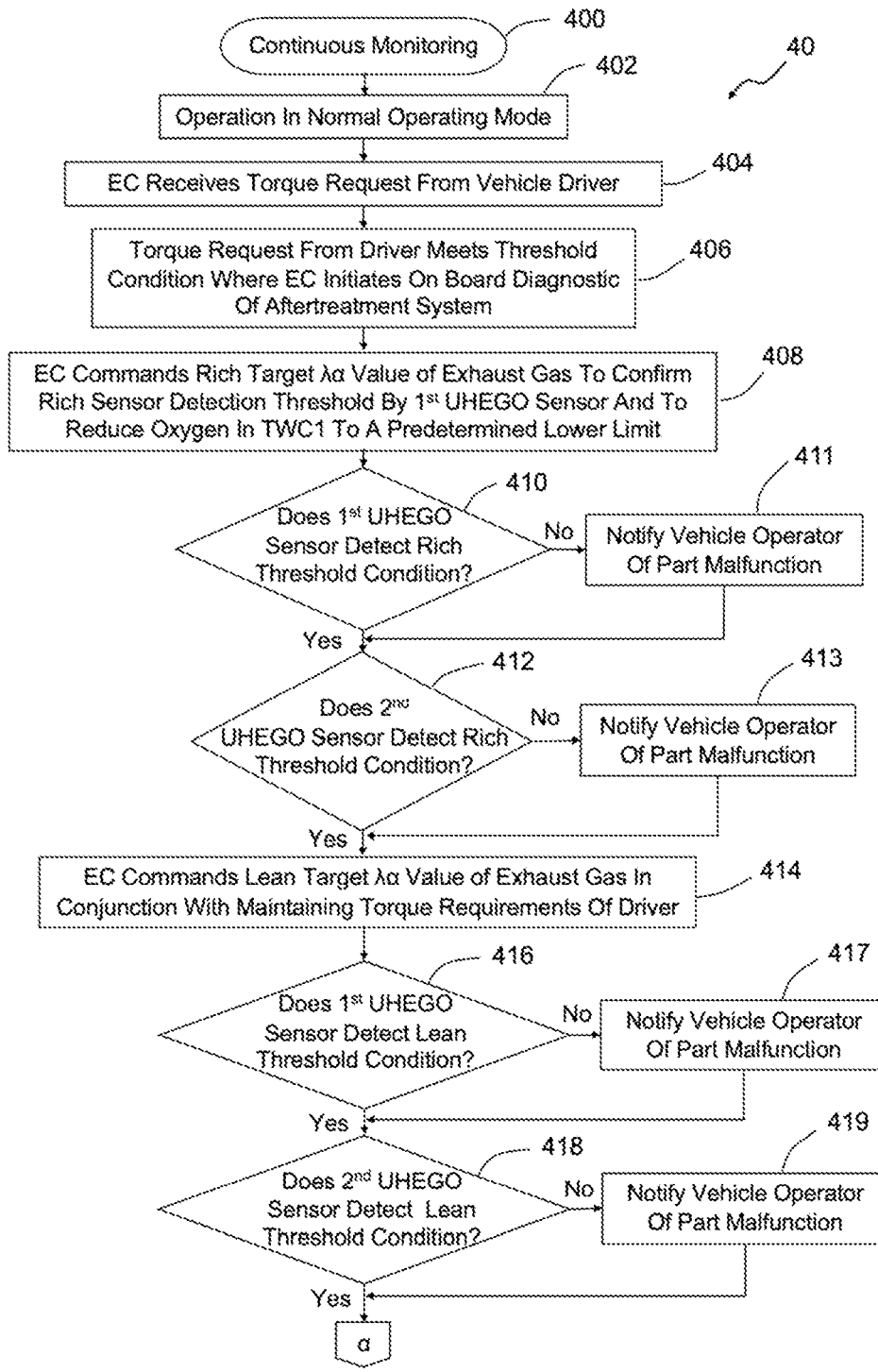
Figure 4B:
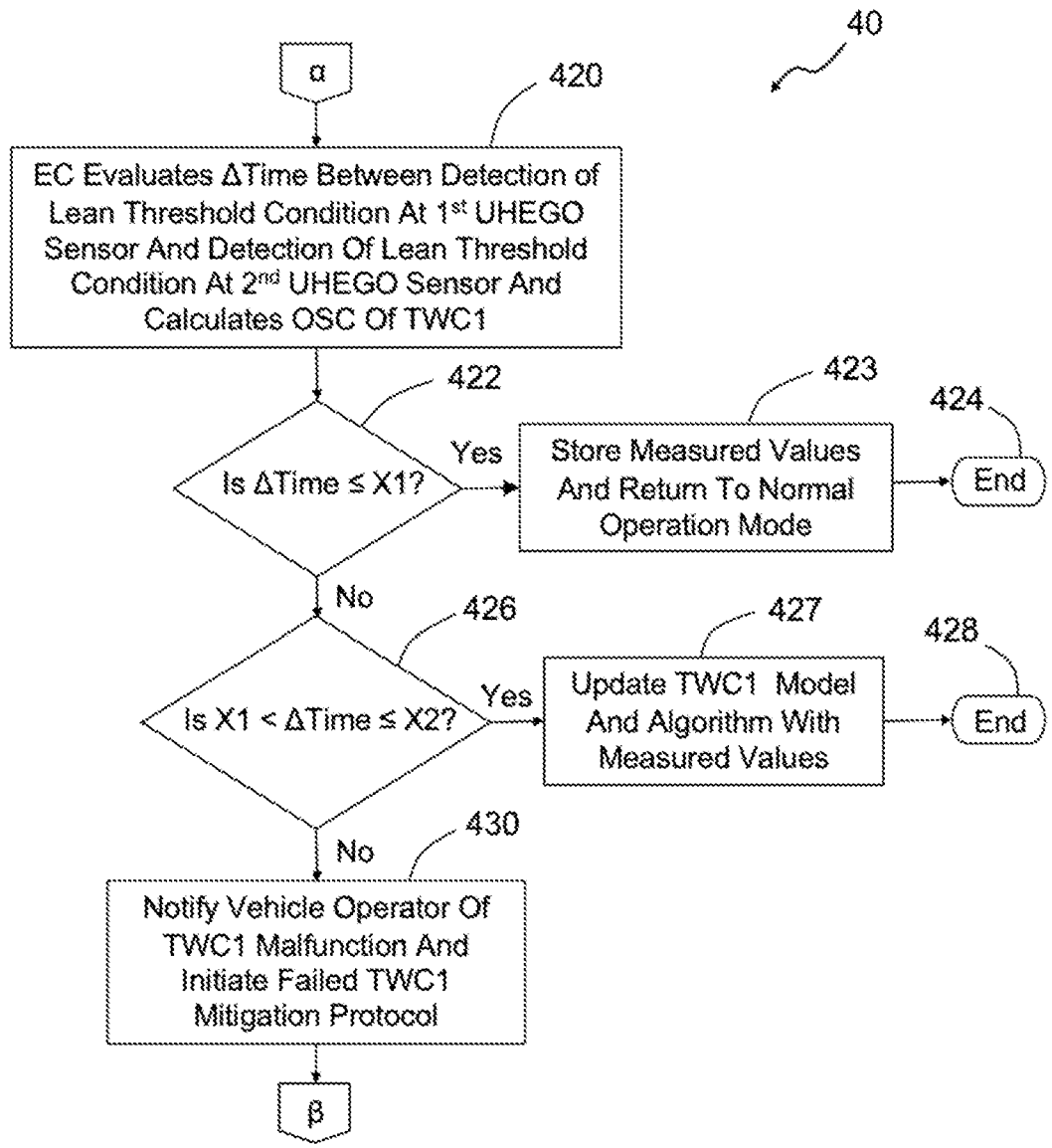
Figure 4C:
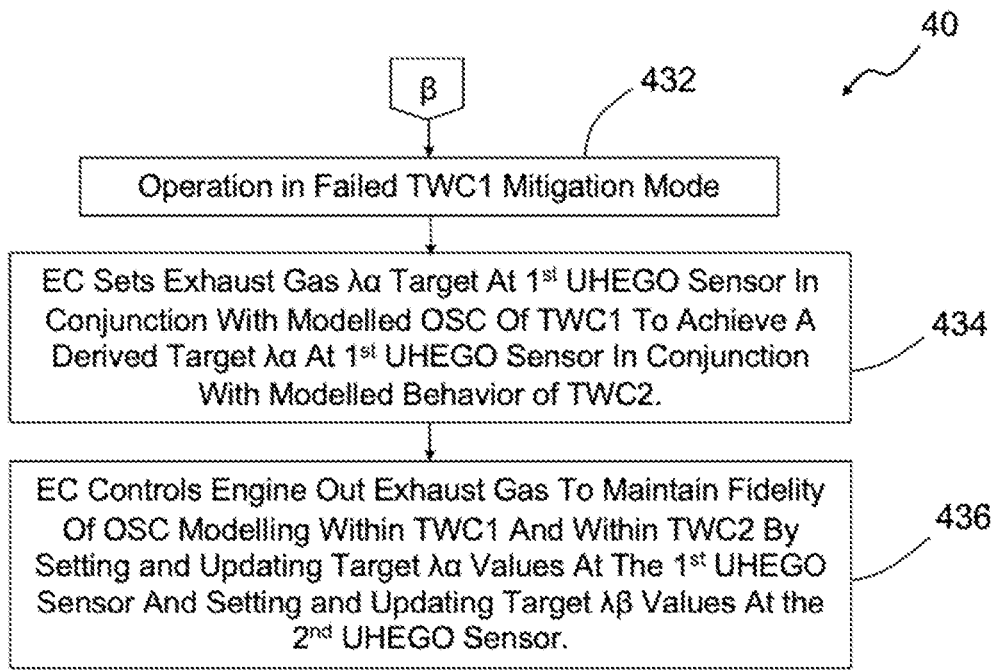
Figure 5:
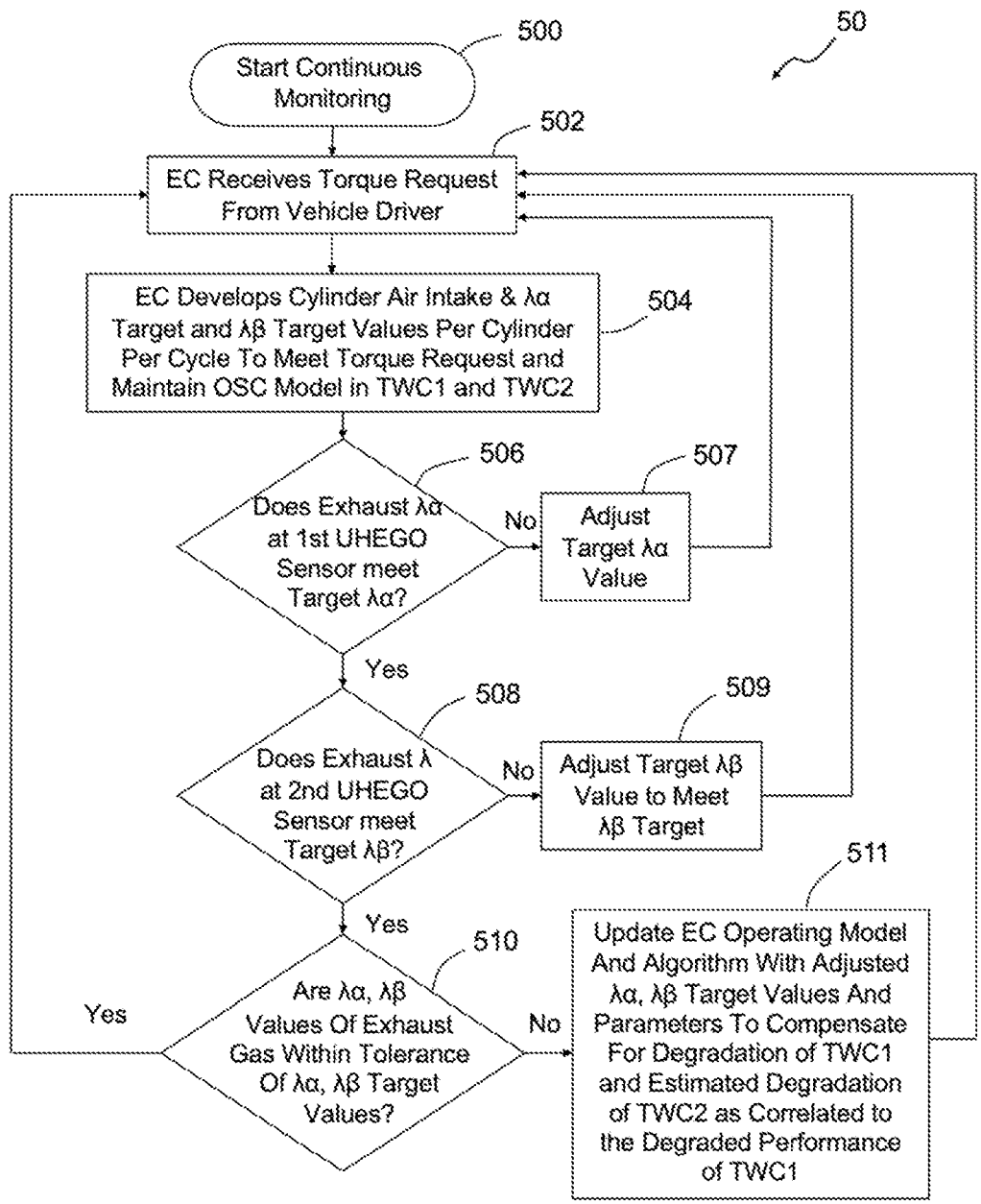

FIGS. 4A-4C is a flow chart of still another method of enhanced exhaust gas aftertreatment according to the teachings of the present disclosure where: FIG. 4A shows a first portion of an OBD mode; FIG. 4B shows a second portion of an OBD mode; and FIG. 4C shows a failed TWC converter mitigation mode; and FIG. 5 is a flow chart of yet still another method of enhanced exhaust gas aftertreatment according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A system for enhancing ICE exhaust gas aftertreatment includes a first or pre-converter UHEGO sensor and a second or post-converter UHEGO sensor disposed in an exhaust pipe of the ICE, and an engine controller (EC) in communication with the first and second UHEGO sensors. The first UHEGO sensor is disposed upstream from a first or primary TWC converter and the second UHEGO sensor is disposed downstream from the first TWC converter and upstream from a second or secondary TWC converter. The EC is configured to monitor and determine a current OSC of the first TWC converter and adjust target exhaust gas lambda parameters as a function of the current OSC of the first TWC converter. For example, as the first TWC converter ages and its OSC has degraded (e.g., been reduced) over time, the engine controller enhances ICE exhaust gas aftertreatment by ensuring exhaust gas flowing through the first TWC converter has a lambda value that falls within a desired range such that the exhaust gas is still oxidized and/or reduced within the first TWC converter. Also, in the event the OSC of the first TWC converter falls below a predefined threshold (e.g., the first TWC converter fails), the EC continues to ensure ICE exhaust gas aftertreatment is effectively treated by ensuring exhaust gas flowing through the second TWC converter has a lambda value that falls within a desired range such that the exhaust gas is still oxidized and/or reduced within the second TWC converter.

Figure 1:
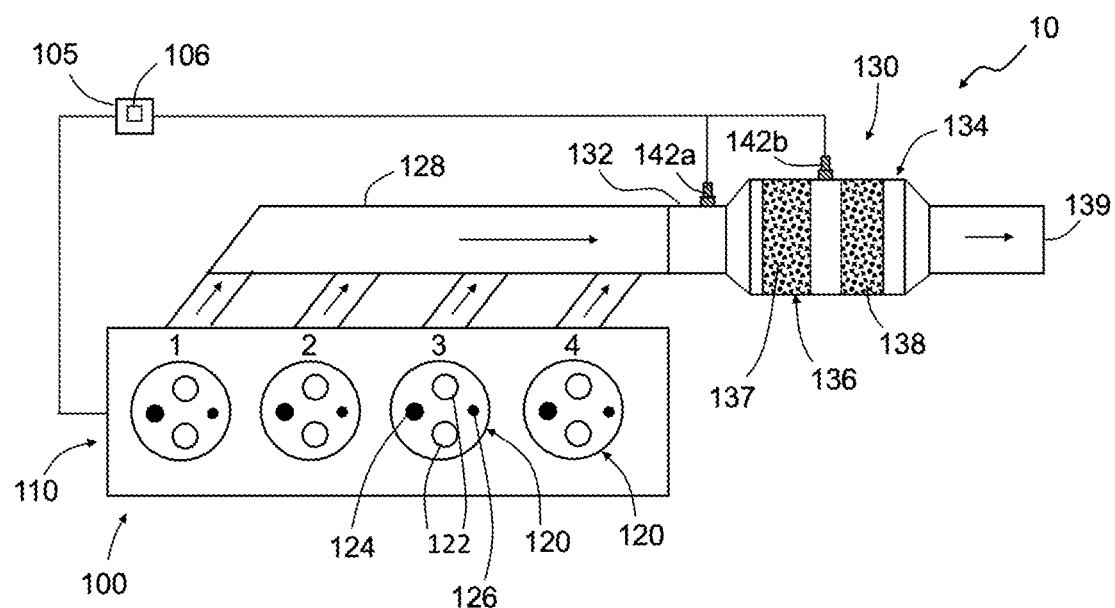
FIG. 1 shows a system for enhancing internal combustion exhaust gas aftertreatment according to the teachings of the present disclosure.

Referring to FIG. 1, a system 10 for enhancing ICE exhaust gas aftertreatment in an exhaust system 130 of an ICE 100 is shown. The ICE 100 includes an EC 105 and a cylinder bank 110 including cylinders 120. Each cylinder 120 includes at least two valves 122 (e.g., an intake valve and an exhaust valve), a fuel injector 124, and a spark initiator 126 (e.g., a spark plug). A manifold 128 is in fluid communication with the cylinder bank 110.

The exhaust system 130 includes an exhaust pipe 132 and an exhaust aftertreatment system 134 with various components to filter exhaust gas flowing therethrough. For example, the exhaust aftertreatment system 134 includes a first three-way catalytic (TWC) converter 136 and a second TWC converter 138 disposed downstream from the first TWC converter 136.

The first TWC converter 136 (and the second TWC converter 138) include a catalyst support 137 or a substrate coated with a one or more catalytic materials (not shown) and one or more oxygen storage promotors (not shown). For example, in some variations of the present disclosure the first TWC converter 136 has a catalyst support 137 in the form of a ceramic monolith that has a honeycomb structure that has been treated (e.g., dipped or "washed") with a slurry of aluminum oxide, titanium oxide, silicon oxide containing catalysts particles such a platinum, palladium and rhodium, among others. Oxygen storage particles such as ceria, ceria-zirconia, among others, may also be suspended in the slurry such that the catalyst particles and the oxygen storage particles are embedded in a thin porous matrix layer that coats the catalyst support 137. It should be understood that when exhaust gas flows through the first TWC converter 136, the exhaust gas comes into contact with the catalyst particles such that chemical reactions occur and/or are enhanced.

For example, the catalyst particles catalyze the oxidation of carbon monoxide (CO) to carbon dioxide ($CO_2$), the oxidation of hydrocarbons ($C_xH_{2x+2}$) to $CO_2$ and water ($H_2O$), and the reduction of nitrogen oxide(s) (e.g., NO) to nitrogen gas ($N_2$) according to reactions (1)-(4) below.

$$2CO + O_2 \rightarrow 2CO_2 \quad (1)$$

$$C_xH_{2x+2}[(3x+1)/2]O_2 \rightarrow xCO_2 + (x+1)H_2O \quad (2)$$

$$2CO + 2NO \rightarrow 2CO_2 + N_2 \quad (3)$$

$$2H_2 + 2NO \rightarrow 2H_2O + N_2 \quad (4)$$

Regarding storage and release of oxygen from the first TWC converter 136, the amount of oxygen flowing into the first TWC converter 136 ($O_{in}$) can be represented or calculated by equation (5) below, the amount of oxygen stored in the first TWC converter 136 as a function of time ($dO_{store}$) can be represented or calculated by equation (6) below, and the amount of oxygen released from the first TWC converter 136 as a function of time ($dO_{release}$) can be represented or calculated by equation (7) below:

$$O_{in} = Ga \times \frac{AF - AF_{st}}{AF_{st}} \times 0.232 \times dt \quad (5)$$

$$dO_{store} = \frac{AF - AF_{st}}{AF_{st}} \times Q \frac{M_{O2}}{M_{air}} \times dt \quad (6)$$

$$dO_{release} = K_{RE} \times \frac{AF - AF_{st}}{AF_{st}} \times OSC_{pre} \times dt \quad (7)$$

In the above expressions, i.e., equations (5)-(7), Ga=intake air volume in grams per second, AF=air/fuel ratio before (upstream) the first TWC converter 136, $AF_{st}$=the stoichiometric air/fuel ratio of the first TWC converter 136, Q=heat, dt=change in time, $M_{O2}$=molecular weight of oxygen gas ($O_2$), $M_{air}$=molecular weight of air, dO=change in oxygen, 0.232=a representation of $O_2$ fraction in atmospheric air, KRE=reaction rate (conversion factor), OSC=oxygen storage capacity, and $OSC_{pre}$=OSC from a previous dt time period. It should be understood that a similar set of equations can be used to calculate the amount of oxygen flowing into the second TWC converter 138, the amount of oxygen stored in the second TWC converter 138 as a function of time, and the amount of oxygen released from the second TWC converter 138 as a function of time.

During operation of the ICE 100, the EC 105 directs fuel via the fuel injectors 124 and air via the valves 122 (i.e., intake valves) into each of the cylinders 120. The EC 105 also directs firing of each of the spark initiators 126 such that the fuel plus air mixture in each cylinder 120 is combusted and expelled from the cylinders 120 via the valves 122 (i.e., exhaust valves) as exhaust gas (not labeled). The exhaust gas expelled from the cylinders 120 flows through the manifold 128, the exhaust pipe 132, the first TWC converter 136, the second TWC converter 138 and exits the exhaust system 130 at outlet 139. As the exhaust gas flows through the exhaust system 130, the first TWC converter 136 oxidizes CO in the exhaust gas to $CO_2$, oxidizes unburnt $C_xH_{2x+2}$ into $CO_2$ and $H_2O$, and reduces NOx into $N_2$. The first TWC converter 136 also stores and releases oxygen ($O_2$) as a function of time and the air/fuel ratio of the exhaust gas flowing through the first TWC converter 136 and the current OSC of the first TWC converter 136 (i.e., how much $O_2$ is currently stored in the first TWC converter 136). It should be understood that the ICE 100 and the first TWC converter 136 are designed and configured to treat exhaust gas from the ICE 100 such that emissions of CO, unburnt $C_xH_{2x+2}$ and NOx do not exceed predefined government emission standards. For example, the EC 105 is configured to command operation of the ICE 100 such that exhaust gas flowing through the first TWC converter 136 has an air/fuel ratio that falls within predefined threshold limits thereby ensuring the first TWC converter 136 is not overloaded with excess amounts of CO, unburnt $C_xH_{2x+2}$ and/or NOx.

Still referring to FIG. 1, the system 10 includes a first universal heated exhaust gas oxygen (UHEGO) sensor 142a upstream from the first TWC converter 136 and a second UHEGO sensor 142b disposed downstream from the first TWC converter 136 and upstream from the second TWC converter 138. In some variations of the present disclosure the first UHEGO sensor 142a and the second UHEGO sensor 142b are disposed in the exhaust pipe 132.

The first UHEGO sensor 142a and the second UHEGO sensor 142b are in communication with the EC 105 by way of, for example, a vehicle communication network (not shown) such as a controller area network (CAN), a local interconnect network (LIN), among others. It should be understood that a UHEGO sensor provides real time lambda ($\lambda$) values in contrast to simple "rich" and "lean" indicators as with heat exhaust gas oxygen (HEGO) sensors. That is, a UHEGO sensor provides an actual $\lambda$ value for an exhaust gas flowing past the UHEGO sensor. It should also be understood that as used herein the term "lambda" and the symbol "$\lambda$" refers to the air/fuel ratio in an exhaust gas where $\lambda$ equal to 1.0 ($\lambda=1.0$) refers to the stoichiometric air-fuel ratio, i.e., the exhaust gas contains the exact amount of fuel and air needed for stoichiometric combustion. Also, $\lambda<1.0$ refers to an air/fuel ratio for exhaust gas with more fuel than air needed for stoichiometric combustion (also referred to herein as "rich" or "rich mixture"), and $\lambda>1.0$ refers to an air/fuel ratio for exhaust gas with less fuel than air needed for stoichiometric combustion (also referred to herein as "lean" or "lean mixture").

Figure 2:
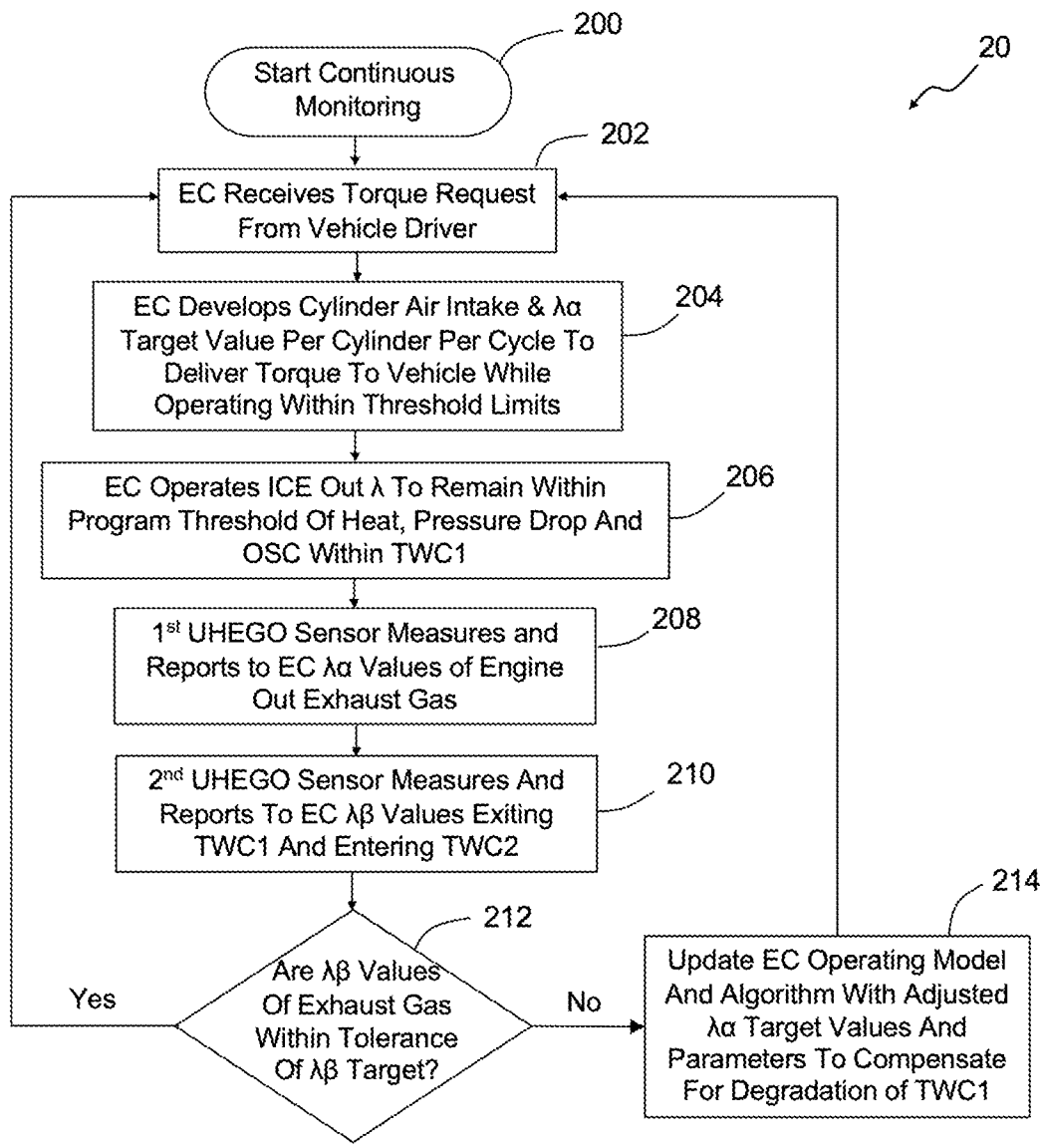
FIG. 2 is a flow chart of a method of enhanced exhaust gas aftertreatment according to the teachings of the present disclosure.

Referring now to FIGS. 1 and 2, a flowchart for a method 20 of enhanced exhaust gas aftertreatment using system 10 is shown. The method 20 includes initiating or starting continuous monitoring of the first TWC converter 136 at 200 (FIG. 2). Non-limiting examples of monitoring the first TWC converter 136 include using the first UHEGO sensor 142a to provide measured $\lambda$ values for exhaust gas flowing into the first TWC converter 136 (referred to herein as "$\lambda\alpha$") to the EC 105 and using the second UHEGO sensor 142b to provide measured $\lambda$ values for exhaust gas flowing out of the first TWC converter 136 (referred to herein as "$\lambda\beta$") to the EC 105.

The method proceeds to 202 where the EC 105 receives a torque request, e.g., an increase in torque from a driver of a vehicle with the ICE 100, and then to 204 where the EC 105 develops a cylinder air intake volume and an target exhaust gas $\lambda\alpha$ value for each cylinder 120 and for each cycle of the ICE 100 while operating within predefined threshold limits. That is, the EC 105 develops a protocol for operation of the ICE 100 such that the torque request received at 202 can be provided while an exhaust gas $\lambda$ (e.g., $\lambda\alpha$) stays within desired or predefined rich and lean exhaust gas $\lambda$ threshold limits. The method 20 then proceeds to 206 where the EC 105 commands or operates the ICE 100 to provide the desired torque request while staying within the desired rich and lean exhaust gas $\lambda$ threshold limits noted above, in addition to remaining within other programmed thresholds such as a heat or temperature threshold of the first TWC converter 136 (abbreviated as "TWC1" in the figures), a pressure drop threshold across the first TWC converter 136 and an OSC threshold of the first TWC converter 136.

The method 20 proceeds to 208 where the first UHEGO sensor 142a measures and reports $\lambda\alpha$ values of exhaust gas flowing into the first TWC converter 136 (referred to as "Engine Out Exhaust Gas" in the figures) to the EC 105. At 210, the method 20 includes the second UHEGO sensor 142b measuring and reporting $\lambda\beta$ values of exhaust gas flowing out of the first TWC converter 136 and into the second TWC converter 138 to the EC 105.

The method 20 proceeds to 212 where the EC 105 determines if the measured $\lambda$ values of the exhaust gas flowing into the second TWC converter 136 (i.e., $\lambda\beta$) are within a predefined tolerance of a predefined $\lambda\beta$ target value. If the measured $\lambda\beta$ values fall within the predefined tolerance of the predefined $\lambda\beta$ target value, the method proceeds back to 202 to receive the next torque request from the driver. In the alternative, if the $\lambda\beta$ values do not fall within the predefined tolerance of the predefined $\lambda\beta$ target value, e.g., the EC 105 compares $\lambda\alpha$ values from the first UHEGO sensor 142a with $\lambda\beta$ values from the second UHEGO sensor 142b and determines the first TWC converter 136 has degraded, the method proceeds to 214 where an EC operating model and algorithm are updated with adjusted $\lambda\alpha$ target values and/or parameters that compensate for the degradation of the first TWC converter 136. In some variations of the present disclosure, the range between $\lambda$ target threshold values can be reduced such that less rich and less lean exhaust gas flows into the first TWC converter 136 thereby limiting the load on the first TWC converter 136. As used herein, the term "load" refers to the amount of chemical species (e.g., CO, $C_xH_{2x+2}$, NOx, among others) to be oxidize or reduced in a TWC converter. In the alternative, or in addition to, a time period between switching between commanding a lean exhaust gas and a rich exhaust gas, and vice versa, can be reduced such that the amount of time a rich or lean exhaust gas flows through the first TWC converter 136 is reduced thereby limiting the load on the first TWC converter 136.

Figure 3:
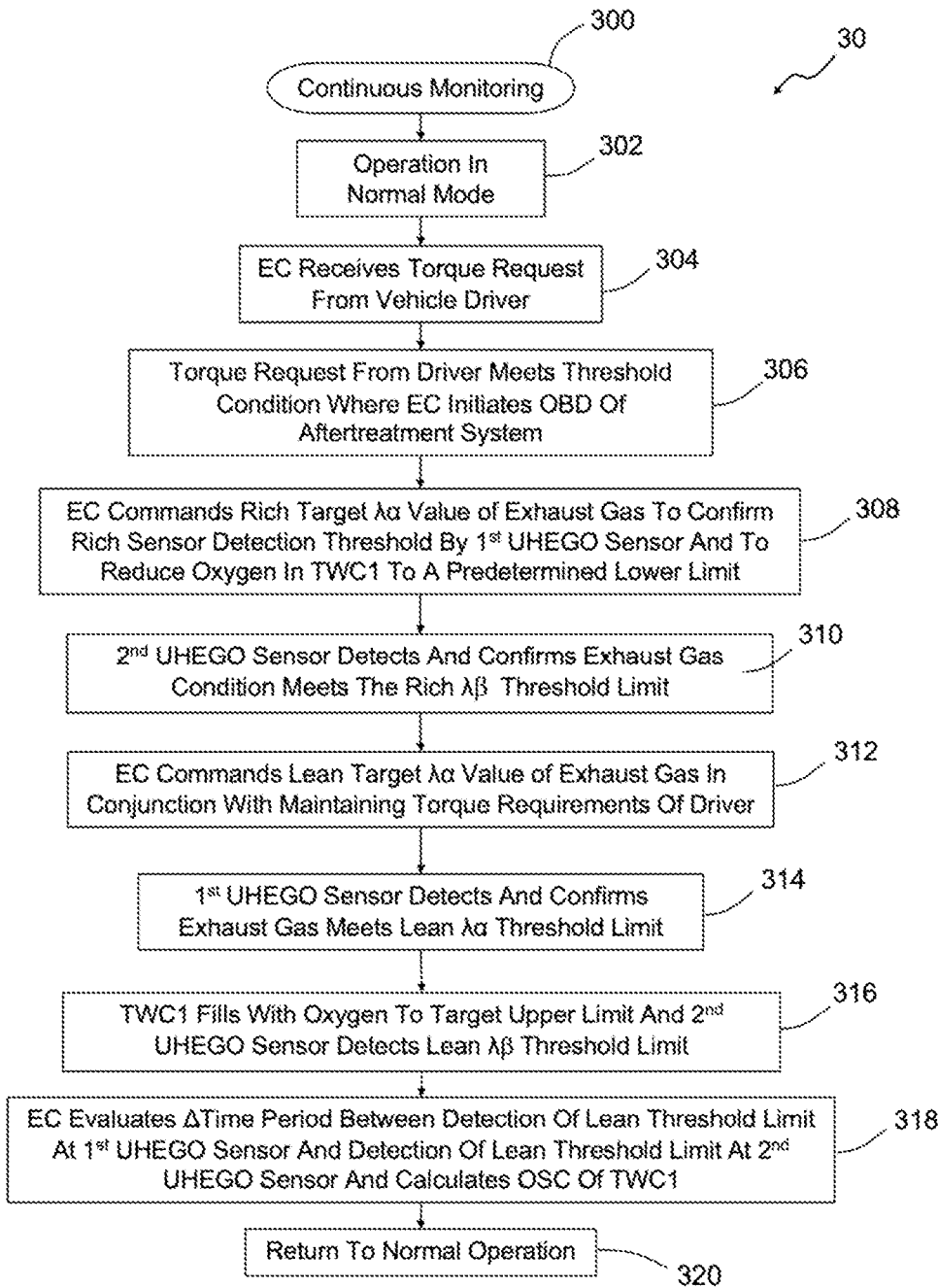
FIG. 3 is a flow chart of another method for enhanced exhaust gas aftertreatment including an on-board diagnostic (OBD) mode according to the teachings of the present disclosure.

Referring now to FIGS. 1 and 3, a flowchart for an on-board diagnostic (OBD) mode executed by the system 10 according to the teachings of the present disclosure is shown. Similar to the method 20 (FIG. 2), a method 30 includes continuous monitoring of the first TWC converter 136 at 300. The EC 105 commands a normal operation mode at 302 and the EC 105 receives a torque request at 304. As used herein, the phrase "normal operation" or "normal operation mode" refers to operation of the ICE 100 such that exhaust gas flowing into the first TWC converter 136 has a $\lambda\alpha$ value of about 1.0. However, unlike method 20, the EC 105 determines the torque request meets a threshold condition that dictates or determines the EC 105 initiate an OBD mode of the exhaust aftertreatment system 134 at 306.

Proceeding to 308, the OBD mode includes commanding a rich target $\lambda\alpha$ value for exhaust gas flowing into the first TWC converter 136 in order to confirm a rich sensor detection threshold by the first UHEGO sensor 142a and to reduce oxygen stored in the first TWC converter 136 to a predetermined lower limit. That is, by providing and flowing rich exhaust gas through the first TWC converter 136, oxygen stored in the first TWC converter 136 is released such that oxidation of unburnt hydrocarbons can be oxidized (e.g., per reaction 2 noted above). At 310, the second UHEGO sensor 142b and EC 105 confirms and determines when the exhaust gas exiting the first TWC converter 136 meets the rich sensor detection threshold limit thereby indicating the first TWC converter 136 has been depleted of oxygen. That is, after 310 has been executed by the method 30, the first TWC converter 136 has been depleted with oxygen to a predefined threshold.

The method 30 proceeds to 312 where the EC 105 commands a lean target $\lambda\alpha$ value for exhaust gas flowing into the first TWC converter 136 while maintaining the torque request and the first UHEGO sensor 142a confirms the exhaust gas flowing into the first TWC converter 136 meets a lean $\lambda\alpha$ threshold limit at 314. At 316 the first TWC converter 136 increases its oxygen storage up to a target upper limit, and the second UHEGO sensor 142*b* and EC 105 confirm and determine when the exhaust gas exiting the first TWC converter 136 meets the lean sensor detection threshold thereby indicating the first TWC converter 136 has reached its full OSC. At 318, the EC 105 evaluates a time period (i.e., elapsed time) between detection of the lean threshold limit at the first UHEGO sensor 142*a* and the lean threshold limit at the second UHEGO sensor 142*b* and calculates a current OSC of the first TWC converter 136 (e.g., using equations 5 and 6 noted above). It should be understood that the current OSC of the first TWC converter 136 is a measure of the degradation, or lack thereof, of the first TWC converter 136. Also, the method 30 proceeds back to normal operation mode at 320.

Referring now to FIGS. 1, 4A, and 4B, a flowchart for another OBD mode executed by the system 10 according to the teachings of the present disclosure is shown. Similar to the method 30 (FIG. 3), a method 40 includes continuous monitoring of the first TWC converter 136 at 400. The EC 105 commands a normal operation mode at 402 and the EC 105 receives a torque request at 404. At 406, the EC 105 initiates an OBD mode of the exhaust aftertreatment system 134. Proceeding to 408, the OBD mode includes commanding a rich target $\lambda\alpha$ value for exhaust gas flowing into the first TWC converter 136 in order to confirm a rich threshold condition at the first UHEGO sensor 142*a* and to reduce oxygen stored in the first TWC converter 136 to a predetermined lower limit. At 410, the second UHEGO sensor 142*b* and the EC 105 determines if the first UHEGO sensor 142*a* detects the rich threshold condition. In the event the first UHEGO sensor does not detect the rich threshold condition at 410, the method 40 proceeds to 411 where the vehicle operator is notified of a part malfunction (e.g., via a MLI). In the alternative, i.e., the first UHEGO sensor 142*a* does detect the rich threshold condition at 410, the method 40 proceeds to 412 where the method 40 determines if the second UHEGO sensor 142*b* detects the rich threshold condition. Similar to the method 40 at 410, if the second UHEGO sensor 142*b* does not detect the rich threshold condition at 412, the method 40 proceeds to 413 where the vehicle operator is notified of a part malfunction. In the alternative, i.e., the second UHEGO sensor 142*b* does detect the rich threshold condition at 412, the method 40 proceeds to 414. It should be understood that after the EC 105 determines the second UHEGO sensor 142*b* has detected the rich threshold condition at 412, the first TWC converter 136 has been depleted with oxygen to a predefined threshold.

At 414, the EC 105 commands a lean target $\lambda\alpha$ value for exhaust gas flowing into the first TWC converter 136 while maintaining the torque request and the first UHEGO sensor 142*a* confirms whether or not the exhaust gas flowing into the first TWC converter 136 meets the lean threshold limit at 316. In the event the first UHEGO sensor 142*a* does not detect the lean threshold condition at 416, the method 40 proceeds to 417 where the vehicle operator is notified of a part malfunction. In the alternative, i.e., the first UHEGO sensor 142*a* does detect the lean threshold condition at 416, the method 40 proceeds to 418 where the method 40 determines if the second UHEGO sensor 142*b* detects the lean threshold condition. If the second UHEGO sensor 142*b* does not detect the lean threshold condition at 418, the method 40 proceeds to 419 where the vehicle operator is notified of a part malfunction. In the alternative, i.e., the second UHEGO sensor 142*b* does detect the lean threshold condition at 418, the method 40 proceeds to 420 (FIG. 4B). At 420, the EC 105 evaluates a time period or the time between detection of the lean threshold limit at the first UHEGO sensor 142*a* and detection of the lean threshold limit at the second UHEGO sensor 142*b* (also referred to herein as "$\Delta$Time") and calculates a current OSC of the first TWC converter 136. Similar to the discussion above regarding FIG. 3, it should be understood that the current OSC of the first TWC converter 136 is a measure of the degradation, or lack thereof, of the first TWC converter 136.

The method 40 proceeds to 422 where the EC 105 determines if $\Delta$Time is less than or equal to a first time period threshold "X1". If $\Delta$Time is less than or equal to X1, the method 40 proceeds to 423 where $\Delta$Time is stored and the EC 105 returns back to normal operation mode at 423. That is, the time required for the first TWC converter 136 to reach full OSC is less than or equal to a first predefined time threshold (i.e., $\Delta$Time$\leq$X1) thereby indicating the first TWC converter 136 is operating within a normal condition.

In the alternative, i.e., $\Delta$Time is greater than X1, the method 40 proceeds to 426 where the EC 105 determines if $\Delta$Time is less than or equal to a second time period threshold "X2". If $\Delta$Time is less than or equal to X2, the method 40 proceeds to 427 where the EC 105 updates a model and algorithm for exhaust gas flowing into the first TWC converter 136 at 147, thereby adjusting the operation of the ICE 100 such that $\lambda\alpha$ values for exhaust gas flowing into the first TWC converter 136 take into account degradation of the first TWC converter 136. That is, the time required for the first TWC converter 136 to reach full OSC is greater than the first predefined time threshold (i.e., $\Delta$Time>X1) but less than the second predefined time threshold (i.e., $\Delta$Time$\leq$X2) thereby indicating the first TWC converter 136 has experienced degradation but can still be used for operation of the ICE 100, i.e., the first TWC converter 136 is in a normal aged condition. As used herein, the phrase "normal aged condition" refers to a condition of a TWC converter that is aged beyond a predefine amount compared to a new TWC converter but still within acceptable government regulation operating conditions. Stated differently, the TWC converter is operating within acceptable government regulations but is showing or exhibiting some deterioration in performance. It should be understood that the model and algorithm for the first TWC converter 136 can be updated such that the EC 105 executes a "normal aged operation mode", i.e., the EC 105 can be configured to switch from a normal operation mode to a normal aged operation mode when the OSC of the first TWC converter 136 is less than a predefined threshold. In addition, in some variations of the present disclosure the EC 105 reduces the range between $\lambda$ target threshold values and/or reduces a time period between switching between lean exhaust gas and rich exhaust gas, and vice versa, for exhaust gas flowing through the first TWC converter 136 thereby limiting the load on the first TWC converter 136 as described above with respect to FIG. 2.

In the alternative, i.e., $\Delta$Time is greater than X2, method 40 proceeds to 430 where the vehicle operator is notified of a malfunction of the first TWC converter 136 and a failed first TWC converter mitigation protocol is initiated at 432 (FIG. 4C). That is, the time required for the first TWC converter 136 to reach full OSC is greater than the second predefined time threshold (i.e., $\Delta$Time>X2) thereby indicating the first TWC converter 136 has experienced failure or degraded to such an extent that exhaust gas flowing through the first TWC converter 136 cannot be properly treated to meet government emissions standards.

Referring now to FIG. 4C, at 432 the EC 105 commands operation of the ICE 100 in a failed first TWC mitigation mode which includes commanding a target $\lambda$ for exhaust gas such that a desired $\lambda$ range is maintained within the second TWC converter 138. Particularly, the method proceeds to 434 where the EC 105 commands a target exhaust gas $\lambda\alpha$ value at the first UHEGO sensor 142a as a function of the OSC (i.e., the modelled OSC) of the failed first TWC converter 136 to achieve or obtain an adjusted or derived target exhaust gas $\lambda\alpha$ value as a function of the modelled OSC of the second TWC converter 138. That is, and although the first TWC converter 136 has been determined to have failed at 426, in some variations of the present disclosure the first TWC converter 136 has a reduced level of OSC that is used to assist in treatment of exhaust gas from the ICE 100. And the EC 105, the first UHEGO sensor 142a, and the second UHEGO sensor 142b.

In some variations, the method 40 proceeds to 436 where the EC 105 controls engine out exhaust gas $\lambda$ to ensure compliance or fidelity of OSC modeling of the first TWC converter 136 and the second TWC converter 138. In at least one variation the EC 105 ensures compliance of the OSC modeling the first TWC converter 136 and the second TWC converter 138 by setting and updating target $\lambda\alpha$ values at the first UHEGO Sensor 142a and setting and updating target $\lambda\beta$ values at the second UHEGO sensor 142b. It should be understood that the failed first TWC mitigation mode includes the EC 105 commanding the target exhaust gas $\lambda\alpha$ value at the first UHEGO sensor 142a such that a target exhaust gas $\lambda\beta$ value at the second UHEGO sensor 142b is achieved. Also, the target exhaust gas $\lambda\beta$ value at the second UHEGO sensor 142b is a function of the condition (e.g., the OSC) of the second TWC converter 138 such that exhaust gas exiting the outlet 139 meets government emission standards.

While the discussions above with respect to FIGS. 2-4C are directed to using the first UHEGO Sensor 142a and the second UHEGO Sensor 142b for executing an OBD, determining when the first TWC converter 136 has failed, and/or operating the ICE 100 in a failed first TWC converter mode, in some variations of the present disclosure the first UHEGO Sensor 142a and the second UHEGO Sensor 142b is used to monitor and/or adjust target exhaust gas $\lambda\alpha$ and/or target exhaust gas $\lambda\beta$ values prior to failure of the first TWC converter 136. That is, the first UHEGO Sensor 142a and the second UHEGO Sensor 142b are used to monitor and employ the second TWC converter 138 for exhaust gas aftertreatment during the useful life of the first TWC converter 136.

For example, and with reference to FIG. 5, a method 50 includes starting continuous monitoring of the first TWC converter 136 at 500 and the EC 105 receiving a torque request from a vehicle driver at 502. Upon receiving the torque request at 502, the method 50 proceeds to 504 where the EC 105 develops a cylinder air intake volume, a target exhaust gas $\lambda\alpha$ value, and a target exhaust gas $\lambda\beta$ per cylinder cycle of the ICE 100 to meet the torque request and maintain a desired OSC (i.e., a model OSC) in the first TWC converter 136 and the second TWC converter 138. At 506, the method 50 determines whether or not the measured exhaust gas $\lambda\alpha$ value meets the target exhaust gas $\lambda\alpha$ value within a predefined threshold $\lambda\alpha$ limit. If the measured exhaust gas $\lambda\alpha$ value does not meet the target exhaust gas $\lambda\alpha$ value within the predefined threshold $\lambda$ limit, the method 50 proceeds to 507 where the ECU 105 adjusts the target exhaust gas $\lambda\alpha$ value and returns to 502. This cycle, i.e., steps 502-504-506-507-502 shown in FIG. 5 continues until the measured exhaust gas $\lambda\alpha$ value meets the target exhaust gas $\lambda\alpha$ value within a predefined threshold $\lambda$ limit at 506. If the measured exhaust gas $\lambda\alpha$ value does meet the target exhaust gas $\lambda\alpha$ value within the predefined threshold $\lambda\alpha$ limit at 506, or when the cycle 502-504-506-507-502 results in the measured exhaust gas $\lambda\alpha$ value meeting the target exhaust gas $\lambda\alpha$ value within the predefined threshold $\lambda$ limit, the method 50 proceeds to 508 where the EC 105 determines whether or not the measured exhaust gas $\lambda\beta$ value meets the target exhaust gas $\lambda\beta$ value within a predefined threshold $\lambda\beta$ limit.

Still referring to FIG. 5, if the measured exhaust gas $\lambda\beta$ value does not meet the target exhaust gas $\lambda\beta$ value within the predefined threshold $\lambda\beta$ limit, the method 50 proceeds to 509 where the ECU 105 adjusts the target exhaust gas $\lambda\beta$ value and returns to 502. This cycle, i.e., steps 502-504-506-508-509-502 shown in FIG. 5 continues until the measured exhaust gas $\lambda\beta$ value meets the target exhaust gas $\lambda\beta$ value within the predefined threshold $\lambda\beta$ limit at 508. If the measured exhaust gas $\lambda\beta$ value does meet the target exhaust gas $\lambda\beta$ value within the predefined threshold $\lambda\beta$ limit at 508, or when the cycle 502-504-506-508-509-502 results in the measured exhaust gas $\lambda\beta$ value meeting the target exhaust gas $\lambda\beta$ value within the predefined threshold $\lambda\beta$ limit, the method 50 proceeds to 510 where the EC 105 determines whether or not both of the measured exhaust gas $\lambda\alpha$, $\lambda\beta$ values are within the predefined threshold $\lambda\alpha$, $\lambda\beta$ limits, respectively. If the measured exhaust gas $\lambda\alpha$, $\lambda\beta$ values are not within the predefined threshold $\lambda\alpha$, $\lambda\beta$ limits, respectively, the method 50 proceeds to 511 where an EC operating model and algorithm are updated with adjusted target exhaust gas $\lambda\alpha$, $\lambda\beta$ values and parameters in order to compensate for the degradation of the first TWC converter 136 and estimated degradation of the second TWC converter 138. In some variations of the present disclosure, the estimated degradation of the second TWC converter 138 is correlated to the degraded performance of the first TWC converter 136. After updating the EC operating model and algorithm at 511, the method 50 proceeds back to 502. This cycle, i.e., steps 502-504-506-508-510-511-502 shown in FIG. 5 continues until the measured exhaust gas $\lambda\alpha$, $\lambda\beta$ values are within the predefined threshold $\lambda\alpha$, $\lambda\beta$ limits, respectively. If the measured exhaust gas $\lambda\alpha$, $\lambda\beta$ values are within the predefined threshold $\lambda\alpha$, $\lambda\beta$ limits, respectively, at 510, or when the cycle 502-504-506-508-510-511-502 results in the measured exhaust gas $\lambda\alpha$, $\lambda\beta$ values being within the predefined threshold $\lambda\alpha$, $\lambda\beta$ limits, respectively, the method 50 proceeds back to 502.

Based on the foregoing, the following provides a general overview of the present disclosure and is not a comprehensive summary.

In one form of the present disclosure, a system for enhancing ICE exhaust gas aftertreatment includes a first universal UHEGO sensor disposed upstream from a first TWC converter and a second UHEGO sensor disposed downstream from the first TWC converter and upstream from a second TWC converter. An engine controller for an internal combustion engine ICE is included and is in communication with the first UHEGO sensor and the second UHEGO sensor. Also, the engine controller is configured to monitor and estimate a current OSC of the first TWC converter, and adjust at least one target exhaust gas lambda parameter as a function of the current OSC of the first TWC converter such that compensation for degradation of the first TWC converter over time is provided.

In some variations of the present disclosure the at least one target exhaust gas lambda parameter is a predefined lambda minimum and a predefined lambda maximum for exhaust gas flowing through the first TWC converter. In other variations, the at least one target exhaust gas lambda parameter is a time period between switching between at least one of a rich target lambda and a lean target lambda for exhaust gas flowing through the first TWC converter and a lean target lambda and a rich target lambda for exhaust gas flowing through the first TWC converter.

In at least one variation the engine controller estimates the current OSC of the first TWC converter as a function of measured lambda values from the first UHEGO sensor, exhaust gas flow rate of exhaust gas flowing through the first TWC converter, and measured lambda values from the second UHEGO sensor.

In some variations the engine controller is configured to adjust a target exhaust gas lambda for exhaust gas flowing through the first TWC converter as a function of the estimated current OSC of the first TWC converter. Also, the engine controller can be configured to switch from a normal operation mode to a normal aged operation mode when the OSC of the first TWC converter is less than a predefined threshold.

In at least one variation the engine controller is configured to adjust a target exhaust gas lambda of exhaust gas flowing through the first TWC converter as a function of an estimated current OSC of the second TWC converter disposed downstream from the second UHEGO sensor when the OSC of the first TWC converter is less than the predefined threshold. In such variations the engine controller can estimate the current OSC of the second TWC converter as a function of measured lambda values from the second UHEGO sensor and an exhaust gas flow rate of exhaust gas flowing through the second TWC converter.

In some variations, the engine controller is configured to initiate an on board diagnostic of the first TWC converter. In such variations the on board diagnostic includes confirming a rich threshold lambda of exhaust gas at the first UHEGO sensor, confirming a rich threshold lambda of exhaust gas at the second UHEGO sensor, confirming a lean threshold lambda of exhaust gas at the first UHEGO sensor, confirming a lean threshold lambda of exhaust gas at the second UHEGO sensor, and determining a time period between confirmation of the lean threshold lambda of the exhaust gas at the first UHEGO sensor and confirmation of the lean threshold lambda of the exhaust gas at the second UHEGO sensor. In such variations the engine controller is configured to operate in a first mode when the time period is less than or equal to a first delta time period, operate in a second mode when the time period is greater than the first delta time period and less than or equal to a second delta time period, and operate in a third mode when the delta time period is greater than the second delta time period.

The first mode includes a first model and algorithm for a first predefined lambda minimum and a first predefined lambda maximum for exhaust gas flowing through the first TWC converter. Similarly, the second mode includes a second model and algorithm for a second predefined lambda minimum and a second predefined lambda maximum for exhaust gas flowing through the first TWC converter, and the third mode includes a third model and algorithm for a third predefined lambda minimum and a third predefined lambda maximum for exhaust gas flowing through the second TWC converter. In some variations the second model and algorithm can be updated relative to the first model and algorithm as a function of a delta time period equal to or greater than the first delta time period and less than or equal to the second delta time period. Also, the third mode includes notification of a first TWC converter failure and initiation of a failed first TWC converter mitigation protocol. In at least one variation the third mode includes a revised lambda minimum and a revised lambda maximum for exhaust gas flowing through the first TWC converter.

In another form of the present disclosure, a vehicle with a system for enhancing ICE exhaust gas aftertreatment includes an ICE with a plurality of cylinders and an exhaust aftertreatment system. The exhaust aftertreatment system includes a first TWC converter, a second TWC converter downstream from the first TWC converter, a first UHEGO sensor disposed upstream from the first TWC converter and a second UHEGO sensor disposed downstream from the first TWC converter and upstream from the second TWC converter. An engine controller for the ICE is included and is in communication with the first UHEGO sensor and the second UHEGO sensor. Also, the engine controller is configured to continuously monitor and estimate a current oxygen storage capacity (OSC) of the first TWC converter and adjust at least one target exhaust gas lambda parameter as a function of the current OSC of the first TWC converter such that compensation for degradation of the first TWC converter over time is provided.

In some variations the at least one target exhaust gas lambda parameter is selected from a predefined lambda minimum and a predefined lambda maximum for exhaust gas flowing through the first TWC converter, a time period between switching between at least one of a rich target lambda and a lean target lambda for exhaust gas flowing through the first TWC converter and a lean target lambda and a rich target lambda for exhaust gas flowing through the first TWC converter, and combinations thereof.

In at least one variation, the engine controller is configured to switch from a normal operation mode to a normal aged operation mode when the OSC of the first TWC converter is less than a predefined threshold, and adjust a target exhaust gas lambda for exhaust gas flowing through the first TWC converter as a function of an estimated current OSC of the second TWC converter disposed downstream from the second UHEGO sensor when the OSC of the first TWC converter is less than the predefined threshold. Also, the engine controller estimates the current OSC of the second TWC converter as a function of measured lambda values from the second UHEGO sensor and an exhaust gas flow rate of exhaust gas flowing through the second TWC converter.

In still another form of the present disclosure, a method of enhancing ICE exhaust gas aftertreatment includes continuously monitoring and estimating a current OSC of a first TWC converter in an exhaust system of an ICE. The ICE has a plurality of cylinders and an exhaust aftertreatment system, and the exhaust aftertreatment system includes the first TWC converter, a second TWC converter downstream from the first TWC converter; a first UHEGO sensor disposed upstream from the first TWC converter, a second UHEGO sensor disposed downstream from the first TWC converter and upstream from the second TWC converter, and an engine controller for the ICE. The engine controller is in communication with the first UHEGO sensor and the second UHEGO sensor and at least one target exhaust gas lambda parameter is adjusted as a function of the current estimated OSC of the first TWC converter such that compensation for degradation of the first TWC converter over time is provided.

In some variations adjusting the at least one target exhaust gas lambda parameter includes setting a predefined lambda minimum and a predefined lambda maximum for exhaust gas flowing through the first TWC converter, switching a time period between at least one of a rich target lambda and a lean target lambda for exhaust gas flowing through the first TWC converter and a lean target lambda and a rich target lambda for exhaust gas flowing through the first TWC converter, or combinations thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for internal combustion engine (ICE) exhaust gas aftertreatment, the system comprising:
    a first universal heated exhaust gas oxygen (UHEGO) sensor disposed upstream from a first three-way catalytic (TWC) converter;
    a second UHEGO sensor disposed downstream from the first TWC converter and upstream from a second TWC converter;
    an engine controller for an internal combustion engine (ICE), the engine controller in communication with the first UHEGO sensor and the second UHEGO sensor, wherein the engine controller is configured to:
    monitoring and estimate a current oxygen storage capacity (OSC) of the first TWC converter; and
    adjust at least one target exhaust gas lambda parameter as a function of the current OSC of the first TWC converter such that compensation for degradation of the first TWC converter over time is provided.

2. The system according to claim 1, wherein the at least one target exhaust gas lambda parameter comprises a revised lambda minimum and a revised lambda maximum for exhaust gas flowing through the first TWC converter.

3. The system according to claim 1, wherein the at least one target exhaust gas lambda parameter comprises a time period between switching between at least one of a rich target lambda and a lean target lambda for exhaust gas flowing through the first TWC converter and a lean target lambda and a rich target lambda for exhaust gas flowing through the first TWC converter.

4. The system according to claim 1, wherein the engine controller estimates the current OSC of the first TWC converter as a function of measured lambda values from the first UHEGO sensor, exhaust gas flow rate of exhaust gas flowing through the first TWC converter, and measured lambda values from the second UHEGO sensor.

5. The system according to claim 1, wherein the engine controller is configured to adjust a target exhaust gas lambda for exhaust gas flowing through the first TWC converter as a function of the estimated current OSC of the first TWC converter.

6. The system according to claim 1, wherein the engine controller is configured to switch from a normal operation mode to a normal aged operation mode when the OSC of the first TWC converter is less than a predefined threshold.

7. The system according to claim 6, wherein the engine controller is configured to adjust a target exhaust gas lambda for exhaust gas flowing through the first TWC converter as a function of an estimated current OSC of the second TWC converter disposed downstream from the second UHEGO sensor when the OSC of the first TWC converter is less than the predefined threshold.

8. The system according to claim 7, wherein the engine controller estimates the current OSC of the second TWC converter as a function of measured lambda values from the second UHEGO sensor and an exhaust gas flow rate of exhaust gas flowing through the second TWC converter.

9. The system according to claim 1, wherein the engine controller is configured to initiate an on board diagnostic of the first TWC converter, the on board diagnostic comprising confirming a rich threshold lambda of exhaust gas at the first UHEGO sensor, confirming a rich threshold lambda of exhaust gas at the second UHEGO sensor, confirming a lean threshold lambda of exhaust gas at the first UHEGO sensor, confirming a lean threshold lambda of exhaust gas at the second UHEGO sensor, and determining a time period between confirming the lean threshold lambda of exhaust gas at the first UHEGO sensor and confirming the lean threshold lambda of exhaust gas at the second UHEGO sensor.

10. The system according to claim 9, where the engine controller is configured to operate in a first mode when the time period is less than or equal to a first delta time period, operate in a second mode when the time period is greater than the first delta time period and less than or equal to a second delta time period, and operate in a third mode when the time period is greater than the second delta time period.

11. The system according to claim 10, wherein the first mode comprises a first model and algorithm for a first predefined lambda minimum and a first predefined lambda maximum for exhaust gas flowing through the first TWC converter.

12. The system according to claim 11, wherein the second mode comprises a second model and algorithm for a second predefined lambda minimum and a second predefined lambda maximum for exhaust gas flowing through the first TWC converter, wherein the second model and algorithm are updated relative to the first model and algorithm as a function of a delta time period equal to or greater than the first delta time period and less than or equal to the second delta time period.

13. The system according to claim 11, wherein the third mode comprises a third model and algorithm for a third predefined lambda minimum and a third predefined lambda maximum for exhaust gas flowing through the second TWC converter.

14. The system according to claim 13, wherein the third model further comprises a revised lambda minimum and a revised lambda maximum for exhaust gas flowing through the first TWC converter.

15. The system according to claim 11, wherein the third mode comprises notification of a first TWC converter failure and initiation of a failed first TWC converter mitigation protocol.

16. An engine with a system for aftertreatment of exhaust gas from the engine, the engine comprising:
    an internal combustion engine (ICE) comprising a plurality of cylinders and an exhaust aftertreatment system having a first three-way catalytic (TWC) converter and a second TWC converter downstream from the first TWC converter;

a first universal heated exhaust gas oxygen (UHEGO) sensor disposed upstream from the first TWC converter and a second UHEGO sensor disposed downstream from the first TWC converter and upstream from the second TWC converter; and an engine controller for an internal combustion engine (ICE), the engine controller in communication with the first UHEGO sensor and the second UHEGO sensor, wherein the engine controller is configured to:

monitor and estimate a current oxygen storage capacity (OSC) of the first TWC converter; and adjust at least one target exhaust gas lambda parameter as a function of the current OSC of the first TWC converter such that compensation for degradation of the first TWC converter over time is provided.

17. The engine according to claim 16, wherein the at least one target exhaust gas lambda parameter is selected from a predefined lambda minimum and a predefined lambda maximum for exhaust gas flowing through the first TWC converter, a time period between switching between at least one of a rich target lambda and a lean target lambda for exhaust gas flowing through the first TWC converter and a lean target lambda and a rich target lambda for exhaust gas flowing through the first TWC converter, and combinations thereof.

18. The engine according to claim 16, wherein the engine controller is configured to:

switch from a normal operation mode to a normal aged operation mode when the OSC of the first TWC converter is less than a predefined threshold; and adjust a target exhaust gas lambda for exhaust gas flowing through the first TWC converter as a function of an estimated current OSC of the second TWC converter disposed downstream from the second UHEGO sensor when the OSC of the first TWC converter is less than the predefined threshold.

19. A method of internal combustion engine exhaust (ICE) gas aftertreatment, the method comprising:

continuously monitoring and estimating a current oxygen storage capacity (OSC) of a first three-way catalytic (TWC) converter in an exhaust system of an ICE, the ICE comprising:

a plurality of cylinders and an exhaust aftertreatment system, the exhaust aftertreatment system comprising:

the first TWC converter and a second TWC converter downstream from the first TWC converter;

a first universal heated exhaust gas oxygen (UHEGO) sensor disposed upstream from the first TWC converter and a second UHEGO sensor disposed downstream from the first TWC converter and upstream from the second TWC converter; and an engine controller for an internal combustion engine (ICE), the engine controller in communication with the first UHEGO sensor and the second UHEGO sensor; and adjusting at least one target exhaust gas lambda parameter as a function of the current estimated OSC of the first TWC converter such that compensation for degradation of the first TWC converter over time is provided.

20. The method according to claim 19, wherein adjusting the at least one target exhaust gas lambda parameter comprises setting a revised lambda minimum and a revised lambda maximum for exhaust gas flowing through the first TWC converter, switching a time period between at least one of a rich target lambda and a lean target lambda for exhaust gas flowing through the first TWC converter and a lean target lambda and a rich target lambda for exhaust gas flowing through the first TWC converter, or combinations thereof.

* * * * *